United States Patent [19]
Erikson et al.

[11] Patent Number: 5,732,596
[45] Date of Patent: Mar. 31, 1998

[54] ANTI-BACKLASH NUT ASSEMBLY

[75] Inventors: Keith W. Erikson, Hollis; Kenneth W. Erikson, Amherst, both of N.H.

[73] Assignee: Kerk Motion Products, Inc., Hollis, N.H.

[21] Appl. No.: 732,819

[22] Filed: Oct. 15, 1996

Related U.S. Application Data

[63] Continuation of Ser. No. 361,065, Dec. 21, 1994, abandoned.

[51] Int. Cl.[6] .............................. F16H 25/20; F16H 55/18
[52] U.S. Cl. ........................ 74/441; 74/409; 74/424.8 A; 74/459
[58] Field of Search .......................... 74/409, 424.8 A, 74/441, 459

[56] References Cited

U.S. PATENT DOCUMENTS

| | | | |
|---|---|---|---|
| 2,385,194 | 7/1945 | Carroll. | |
| 4,131,031 | 12/1978 | Erikson et al. | 74/441 |
| 4,353,264 | 10/1982 | Erikson et al. | 74/441 |
| 4,433,590 | 2/1984 | Benoit et al. | 74/409 |
| 4,643,041 | 2/1987 | Benton | 74/441 |
| 5,367,915 | 11/1994 | Nishii | 74/441 |

FOREIGN PATENT DOCUMENTS

| | | |
|---|---|---|
| 2 105 816 | 8/1982 | United Kingdom. |
| 2 249 606 | 11/1990 | United Kingdom. |

*Primary Examiner*—Charles A. Marmor
*Assistant Examiner*—Troy Grabow
*Attorney, Agent, or Firm*—Hamilton, Brook, Smith & Reynolds, P.C.

[57] ABSTRACT

An anti-backlash nut, movable along a rotatable screw. The nut has internal threads complementary to the threads in the screw. The nut has two nut halves movable as a unit and also rotatable relative to each other on the screw. Means are connected to the nut halves to induce their relative rotation on the screw in opposite directions and there are elastomeric friction means between the two halves to limit their relative rotational movement.

10 Claims, 2 Drawing Sheets

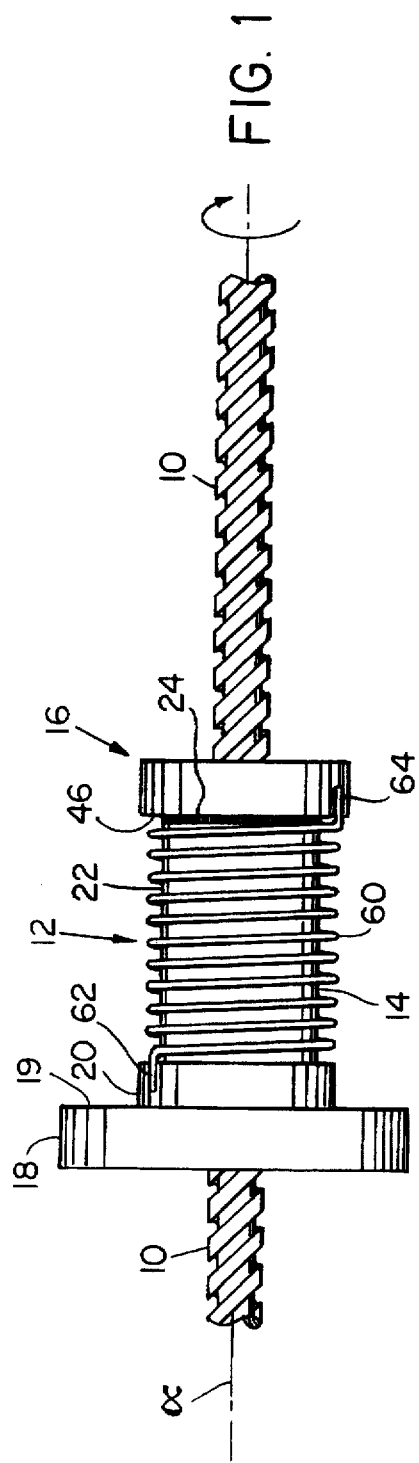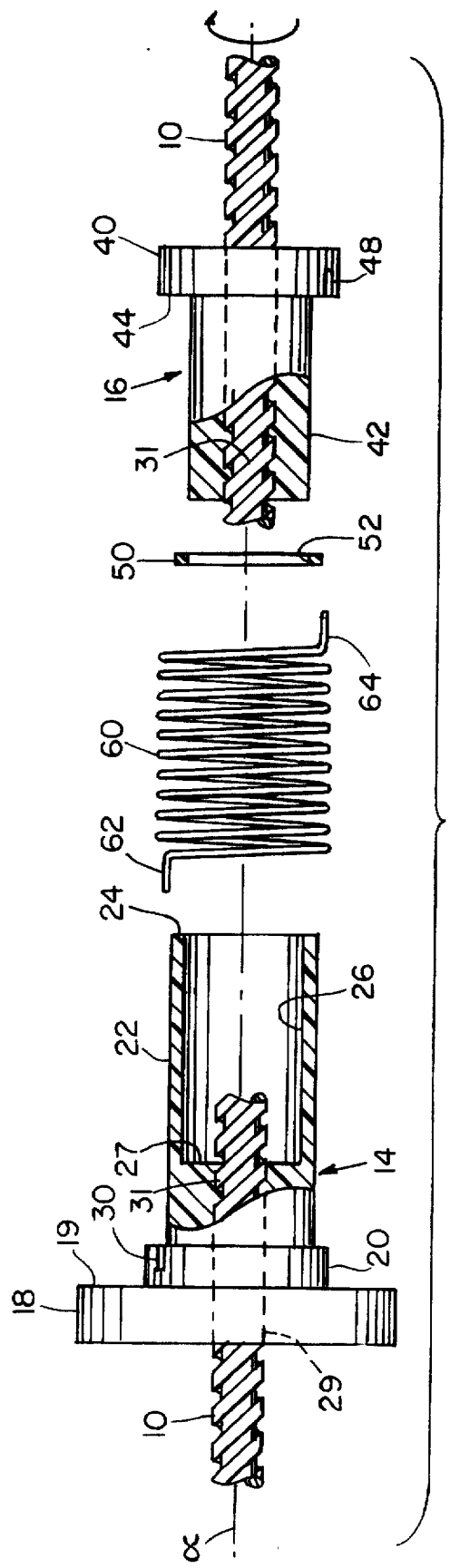

5,732,596

1
ANTI-BACKLASH NUT ASSEMBLY

RELATED APPLICATION

This application is a continuation of application Ser. No 08/361,065 filed Dec. 21, 1994 now abandoned, which is incorporated herein by reference in its entirety.

BACKGROUND OF THE INVENTION

Many modern day machines, from data printers to positioning devices to robots and the like, require an element to reciprocate at relatively high speeds and with considerable accuracy. Today's standards require such equipment to have good positional repeatability, reliability and long life. A typical element for accomplishing this is an anti-backlash nut threaded onto a lead screw that traverses back and forth when the screw rotates.

One such element is disclosed in our U.S. Pat. No. 4,131,031 which includes an anti-backlash nut assembly which undergoes translational movement back and forth along a lead screw in response to the rotation of the screw. The nut itself is divided into two halves, both of which have internal threads complementary to the thread on the screw. The two portions or halves of the nut are retained on the screw, being secured in a radial direction, by a spacer in the form of a tube or collar. A spring is used to apply an axial biasing force in the longitudinal direction of the screw, forcing the nut halves apart, to minimize or eliminate backlash.

While anti-backlash nuts made in accordance with our above-identified patent have proven satisfactory, they are somewhat limited because of the spring employed. The spring biases the nut halves apart to urge their thread flanges against opposite thread flanks of the lead screw. If a load were imparted to one of the nut halves without the spring in place, the opposite nut half would translate with respect to the first nut half because there is nothing to restrain it. The anti-backlash feature of the invention is dependent upon the axial force of the spring itself. Since the load is transferred through the spring, a spring of high compressibility or stiffness causes too great a frictional force and, thus, loss of efficiency. Conversely, too weak a spring would not adequately reduce backlash. Thus, the anti-backlash aspect is only as good as the force of the spring. It is to this problem the present invention is directed.

Another element is to be found in our U.S. Pat. No. 4,353,264 in which we have disclosed an anti-backlash nut assembly which also undergoes translational movement longitudinally along a screw in response to rotational movement of the screw. The mechanism employs a nut which is split into two nut halves which are internally threaded with the same thread and hand as the screw. The two nut halves are retained in the radial direction by a coaxial cylinder surrounding portions of the nut halves. In addition, a spacer is mounted on the retainer means between the nut surfaces and is biased against at least one of the surfaces to close any gap which may occur between the thread of the screw and the thread of the nut. Thus, the biasing is accomplished by employing a number of mechanical elements.

Whenever a number of elements are used for establishing this biasing, they are inherently weak in terms of axial stiffness due to mechanical and manufacturing fit problems. The ideal anti-backlash nut would have unlimited axial stiffness such that when a load is applied in either direction, no discernible movement would occur due to the elasticity of the nut itself. The anti-backlash aspect of the nut is only as good as the stiffness of the nut which has been created. It is the intent of this invention to solve such a problem.

2
SUMMARY OF THE INVENTION

The invention resides in an anti-backlash nut which is designed to undergo bidirectional translation, i.e. back and forth along a rotatable lead screw. The nut has internal threads which are complementary to the thread on the screw. The nut itself comprises two nut halves which are movable as a unit along the rotatable lead screw and also rotatable relative to each other on the screw.

There are means joining the nut halves to induce their relative rotation on the screw, in opposite directions, toward a closed position, wherein the backlash between the threads of the screw and the threads of the nut is taken up. A torsion spring has been used satisfactorily to induce rotation.

In addition, there are means between the nut halves to limit their relative rotational movement when they are in the closed telescoping position to prevent the backlash from recurring. A high friction elastomeric washer has been employed between the nut halves for this purpose.

In one embodiment of the invention, one of the nut halves includes a face plate for attaching the nut to a load.

In another embodiment of the invention, one of the nut halves telescopes rotatably within the other.

In yet another embodiment of the invention, each of the nut halves has a face extending transversely of the screw at least one of which faces is coated with a high friction elastomeric material.

The above and other features of the invention including various and novel details of construction and combination of parts will now be more particularly described with reference to the accompanying drawings and pointed out in the claims. It will be understood that the particular anti-backlash nut assembly embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 1 is a side elevation of an anti-backlash nut assembly on lead screw illustrating the invention.

FIG. 2 is the anti-backlash nut of FIG. 1 shown in exploded view and partly in section.

DETAILED DESCRIPTION OF THE INVENTION

Figure 3:
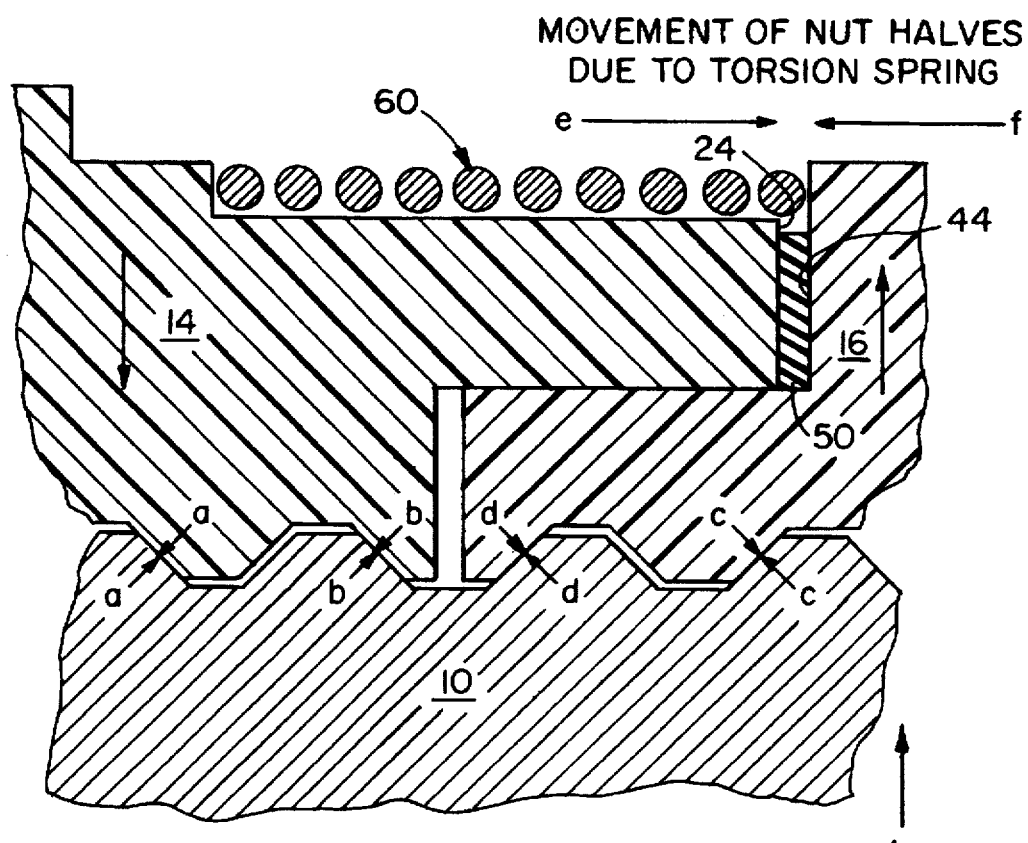
FIG. 3 is a sectional detailed view on an enlarged scale of two anti-backlash nut halves and the lead screw of FIG. 1.

Referring to FIGS. 1 and 2, an anti-backlash nut embodying the invention will be described. A right hand threaded lead screw 10 is shown mounting an anti-backlash nut assembly generally designated 12. The nut comprises a first or left hand nut portion 14 and a second or right hand nut portion 16 which are driven in bidirectional translation, back and forth along the screw 10 by the rotation of the screw. The nut portions 14 and 16 are also called nut halves. The left hand nut half 14 has a face plate 18 for joining the nut to a load to be reciprocated back and forth by the lead screw. A circular portion 20 projects from the right hand surface of the face plate 18. A second cylindrical member 22 (FIG. 2) projects from the circular member 20 and terminates in a circular or ring-shaped flat face 24 which is formed at right angles to the axis α of the lead screw 10. A circular bore 26 is formed in the face 24 of the cylindrical member 22 and terminating at a wall 27 (FIG. 2).

The center of the face plate 18, the cylindrical member 20 and a portion of the cylindrical member 22 are formed with internal screw threads 29 along the axis α. They are the same size and hand as the threads on the lead screw 10. A small bore 30 is formed in the circular portion 20.

The right nut half 16 will now be described. It includes a cylindrical portion 40 and a second smaller cylindrical portion 42. The interior of the nut half 16 is also provided with threads 31 of the same size and hand as the threads of the lead screw 10. The cylindrical portion 40 has a flat face 44 formed normal to the axis α of the lead screw and the threads 31. Face 44 and face 24 are parallel and may be engagable when the nut halves are assembled as will be explained hereinafter. Formed in the cylindrical portion 48 is a second small bore 48.

Anti-friction means in the form of a high friction, elastomeric washer 50 is provided. It has a circular bore 52 just slightly larger than the diameter of the cylindrical portion 42 of the nut half 16 such that the elastomeric washer may be slid over the cylindrical portion 42 and abut the face 44 when the nut halves are assembled. It will also then abut the face or circular ring 24. A torsion spring 60 having tangs 62 and 64 is provided to induce relative rotation (in opposite directions) of the nut halves on the screw when they are assembled as shown in FIG. 1.

Each of the nut halves 14, 16 are threaded onto the lead screw 10 as shown in FIG. 1 with the cylindrical portion 42 of the right nut half telescoping into the cylindrical opening 26 in the left nut half. The torsion spring 60 is given a twist to tighten it slightly. The tang 62 is inserted into the bore 60 and the tang 64 is inserted into the bore 48. In the assembled position shown in FIG. 2, the elastomeric washer 52 is located between the face 24 on the nut half 14 and the face 46 on the nut half 16 which parts are in closed abutting position against the washer 50 due to the torsion spring rotating the nut halves in opposite directions.

Figure 4:
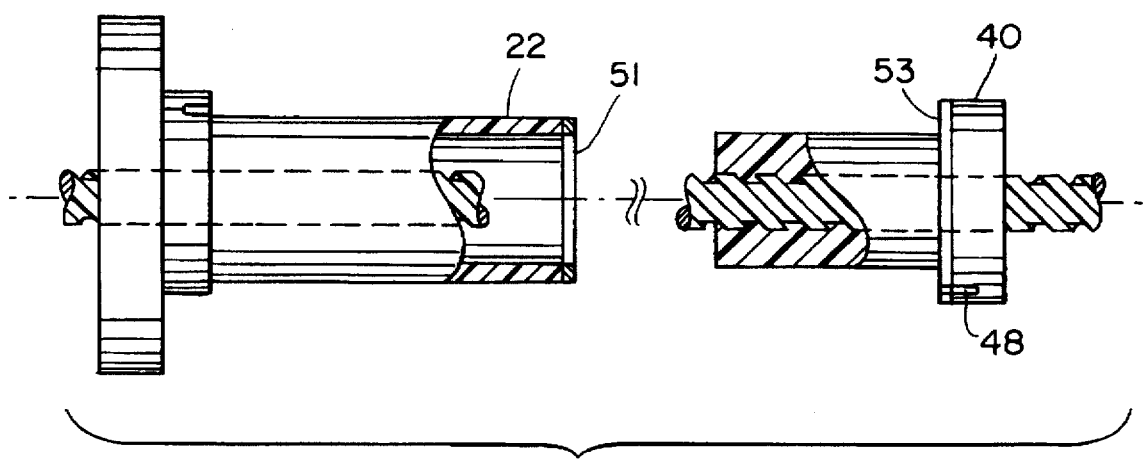
FIG. 4 is a view of the anti-backlash nut of FIG. 1 shown in exploded view and partly in section showing the nut halves having at least one face each coated with a high friction elastomeric material.

Another embodiment of the invention is to coat the faces 24, 44 (shown in FIG. 2) of the nut halves with high-friction elastomeric material 51, 53 (shown in FIG. 4), as for example, by spraying. Thus, the high-friction elastomeric washer 50 could be replaced.

Wherein the torsion inducing means is shown as a conventional torsion spring 60 with tangs 62 and 64, any equivalent means could be employed to cause opposite rotation of the nut halves, as for example, a pre-stressed elastomeric sleeve or elastomeric binders secured to the nut halves on a bias.

Referring to FIG. 3, when the torsion spring is in the assembled position shown in FIG. 1, the left hand nut half 14 is induced to rotate in the direction of the downward pointing arrow on the nut half. The nut half 16 is induced to rotate in the direction of the upward pointing arrow on the nut half in FIG. 3. The nut halves rotate in opposite directions. Gaps between the flanks of the lead screw 10 and the threads of the nut half 14 is thus taken up with engagement taking place at a—a and b—b. Conversely, nut half 16 being induced to rotate in the opposite direction results in engagement of the thread flanks at c—c and d—d, the nut halves moving in the direction of the arrows e and f, in other words, toward each other. This continues while the face 24 of nut half 14 moves towards the face 44 of nut half 16. The nut halves then come to rest against the opposite surfaces of the high-friction elastomeric washer 50. If the washer is not used and the sprayed anti-friction material is, the faces 24 and 44 will abut each other. This is called the locked position whereupon no further relative rotation of the nut halves 14, 16 takes place. They are jammed against the thread flanks at a—a, b—b, c—c and d—d. No further rotation takes place and, more importantly, no reverse rotation takes place because of the high frictional contact between the washer 50 and the faces 24, 44 or the coated faces themselves. Rotation of the lead screw 10 in the direction of the upward facing arrow (i.e. clockwise when viewed from the right in FIG. 3) will cause the nut halves to move toward the right as a unit carrying whatever load is attached to the face plate 18 on the nut half 14.

Upon the end of the traverse of the lead screw 10 to the right, with the nut half 14 pushing the nut half 16 to the right as viewed in FIG. 3, the length of the lead screw, the direction of the lead screw is reversed. At that time, the thread flanks are still in engagement at c—c, d—d and there will be no lost movement because of backlash since these surfaces are already in intimate contact. The nut halves being biased in such a manner creates a wedging effect and locking of the two nut system.

If wedging did not occur, the nuts would act independently of each other and backlash, due to gaps between the thread flanks, would take place. The load applied to the left nut half 14 or mounting nut would merely cause the right nut half 16 to rotate with respect to the left.

However, the utilization of the high-friction elastomeric washer 50 or the coated faces 24, 44 in conjunction with the torsion spring's ability to rotate one nut half with respect to the other to maintain intimate contact between the two nut halves with the elastomeric friction washer and with the engaged thread flanks, the backlash is eliminated.

Consequently, any axial force applied to the left nut half 14 passes through the friction washer 50 before reaching the right nut half 16. The friction restricts the right nut half's ability to rotate relative to the left nut.

As wear occurs at the thread nut halves and screw flank's contact areas a—a, b—b, c—c, d—d, because the torsion spring 60 is acting on the nut halves constantly to urge them against the flanks of the screw thread, gaps do not appear at the contact areas. However, the force applied to the elastomeric washer 50 or, in the alternative, to the coated surfaces 24, 44 tends to lessen permitting the torsion spring 60 to continue to rotate the nut halves together rather than to allow a gap to occur at the washer 50 or at the coated surfaces 24, 44. Consequently, the system is not dependent upon force of a compression spring, as in our earlier patent, U.S. Pat. No. 4,131,031. Wear is compensated for and a relatively low lock force is required to maintain the system's stiffness.

Through its simplicity, lack of numerous parts, and manner of functioning, the problems of our U.S. Pat. No. 4,353,264 are obviated.

We claim:

1. An anti-backlash nut designed to undergo bidirectional translation along a rotational screw having external threads thereon, the nut having internal threads complimentary to the screw threads, said nut comprising:

(a) two nut halves, each having said internal threads and being movable as a unit and relative to each other on the screw, (b) a torsion spring joining the two nut halves to induce their relative rotation on the screw in opposite directions toward a closed abutting position to take up backlash between the screw threads and the internal threads on the nut, characterized in that (c) high friction elastomeric means are provided between faces formed on each nut half normal to said screw to create high frictional contact between the high friction elastomeric means and the faces to limit relative rotational movement between the nut halves when they are in the closed abutting position and to permit the nut halves to translate along the rotational screw.

2. An anti-backlash nut according to claim 1, wherein the high friction elastomeric means provided between the faces formed on each nut half is a high friction, elastomeric washer.

3. The anti-backlash nut according to claim 1, wherein the high friction elastomeric means to limit relative rotational movement between the nut halves comprises a high friction elastomeric material coated on at least one of said faces.

4. An anti-backlash nut according to claim 1, wherein one of said nut halves include a faceplate for attaching the nut to a load.

5. An anti-backlash nut according to claim 1, wherein one of said nut halves telescopes rotatably within the other.

6. An anti-backlash nut designed to undergo bidirectional translation along a rotational screw having external threads thereon, the nut having internal threads complimentary to the screw threads, said nut comprising:

(a) two nut halves, each having said internal threads and being movable as a unit and relative to each other on the screw, (b) a torsion spring joining the two nut halves to induce their relative rotation on the screw in opposite directions toward a closed abutting position to take up backlash between the screw threads and the internal threads on the nut, characterized in that (c) high friction elastomeric means are provided between faces formed on each nut half normal to said screw to make the coefficient of friction between the two nut halves higher than the coefficient of friction of the threads of the nut halves to the lead screw to limit relative rotational movement between the nut halves when they are in the closed abutting position and to permit the nut halves to translate along the rotational screw.

7. An anti-backlash nut according to claim 1, wherein the high friction elastomeric means provided between the faces formed on each nut half is a high friction, elastomeric washer.

8. An anti-backlash nut according to claim 1, wherein the high friction elastomeric means to limit rotational movement between the nut halves comprises a high friction elastomeric material coated on at least one of said faces.

9. An anti-backlash nut according to claim 1, wherein one of said nut halves include a faceplate for attaching the nut to a load.

10. An anti-backlash nut according to claim 1, wherein one of said nut halves telescopes rotatably within the other.

* * * * *